United States Patent
Mori (10) Patent No.: US 10,196,963 B2
(45) Date of Patent: Feb. 5, 2019

(54) INTERNAL COMBUSTION ENGINE

(71) Applicant: Toyota Jidosha Kabushiki Kaisha, Toyota-shi, Aichi-ken (JP)

(72) Inventor: Sachio Mori, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/895,090

(22) Filed: Feb. 13, 2018

(65) Prior Publication Data

US 2018/0230895 A1 Aug. 16, 2018

(30) Foreign Application Priority Data

Feb. 13, 2017 (JP) ................................. 2017-024075

(51) Int. Cl.
*F02B 19/18* (2006.01)
*F02B 19/12* (2006.01)
*F02B 19/08* (2006.01)

(52) U.S. Cl.
CPC ............... *F02B 19/18* (2013.01); *F02B 19/08* (2013.01); *F02B 19/12* (2013.01)

(58) Field of Classification Search
CPC ........... F02B 19/18; F02B 19/08; F02B 19/12
See application file for complete search history.

(56) References Cited

U.S. PATENT DOCUMENTS

| 4,029,062 | A | * | 6/1977 | Noguchi | ............. | F02B 19/1004 |
| | | | | | | 123/270 |
| 4,080,938 | A | * | 3/1978 | Noguchi | ............. | F02B 19/1066 |
| | | | | | | 123/268 |
| 4,596,214 | A | * | 6/1986 | Yagi | ........................ | F02B 19/12 |
| | | | | | | 123/260 |

FOREIGN PATENT DOCUMENTS

JP          H08284665 A          10/1996

* cited by examiner

*Primary Examiner* — Hieu T Vo
(74) *Attorney, Agent, or Firm* — Dinsmore & Shohl LLP (57) ABSTRACT

An internal combustion engine includes: a main combustion chamber; an intake port connected to the main combustion chamber; an exhaust port connected to the main combustion chamber; a sub-chamber; and a spark plug in the sub-chamber. The sub-chamber is provided between the intake opening portion and the exhaust opening portion and connected to the main combustion chamber through a plurality of communication holes. The communication holes include a first communication hole provided on the intake opening portion side, and a second communication hole provided on the exhaust opening portion side. The first communication hole is closer to a piston than the second communication hole is. The first communication hole is inclined to be closer to the piston as the first communication hole is positioned toward the inside from the outside of the sub-chamber.

7 Claims, 9 Drawing Sheets

<COMPARATIVE EXAMPLE>

INTERNAL COMBUSTION ENGINE

CROSS-REFERENCE TO RELATED APPLICATIONS

This application claims priority to Japanese Patent Application No. 2017-024075 filed on Feb. 13, 2017, which is incorporated herein by reference in its entirety inducing the specification, drawings and abstract.

BACKGROUND

1. Technical Field

The disclosure relates to an internal combustion engine in which spark ignition is performed in a sub-chamber provided in a main combustion chamber.

2. Description of Related Art

Japanese Unexamined Patent Application Publication No. 8-284665 (JP 8-284665 A) discloses an internal combustion engine having a main combustion chamber and a sub-chamber provided in the main combustion chamber. The sub-chamber is connected to the main combustion chamber through a communication hole. In a compression process, a part of an air-fuel mixture in the main combustion chamber enters the sub-chamber through the communication hole. A spark plug is provided in the sub-chamber and combustion is started by performing spark ignition in the sub-chamber. Flame generated in the sub-chamber is ejected into the main combustion chamber through the communication hole.

SUMMARY

Regarding an internal combustion engine in which spark ignition is performed in a sub-chamber provided in a main combustion chamber, the inventor of the present application focused on the following point. That is, when a lot of residual gas from the previous cycle remains in the sub-chamber, ignitability and combustibility in the sub-chamber deteriorate. In order to improve the ignitability and the combustibility in the sub-chamber, it is significant to effectively perform purge in the sub-chamber.

The disclosure provides a technique capable of effectively performing purge in a sub-chamber in an internal combustion engine in which spark ignition is performed in the sub-chamber provided in a main combustion chamber.

An aspect of the disclosure relates to an internal combustion engine including: a main combustion chamber interposed between a cylinder head and a piston facing the cylinder head; an intake port which is provided in the cylinder head and connected to the main combustion chamber at an intake opening portion; an exhaust port which is provided in the cylinder head and connected to the main combustion chamber at an exhaust opening portion; a sub-chamber which is provided on the cylinder head between the intake opening portion and the exhaust opening portion and connected to the main combustion chamber through a plurality of communication holes; and a spark plug provided so as to perform ignition in the sub-chamber. The communication holes include a first communication hole provided on the intake opening portion side in a side wall of the sub-chamber, and a second communication hole provided on the exhaust opening portion side in the side wall. The first communication hole is closer to the piston than the second communication hole is. The first communication hole is inclined so as to be closer to the piston as the first communication hole is positioned toward the inside from the outside of the sub-chamber.

In the internal combustion engine according to the aspect of the disclosure, the second communication hole may be inclined so as to be closer to the piston as the second communication hole is positioned toward the outside from the inside of the sub-chamber.

In the internal combustion engine according to the aspect of the disclosure, the first communication hole may narrow toward the inside from the outside of the sub-chamber.

In the internal combustion engine according to the aspect of the disclosure, the second communication hole may narrow toward the outside from the inside of the sub-chamber.

In the internal combustion engine according to the aspect of the disclosure, the communication holes may further include a third communication hole provided in a bottom wall of the sub-chamber.

In the internal combustion engine according to the aspect of the disclosure, a direction toward the exhaust opening portion from the intake opening portion may be a first direction, and the bottom wall may be closer to the piston as the bottom wall is positioned in the first direction.

In the internal combustion engine according to the aspect of the disclosure, the third communication hole may narrow toward the outside from the inside of the sub-chamber.

Hereinafter, for description, a direction approaching the piston when viewed in the main combustion chamber is called a "D direction", and a direction opposite to the D direction is called a "U direction". The direction of an intake flow which is supplied from the intake port is an oblique direction that includes a D direction component. According to the aspect of the disclosure, such an intake flow is used for purging in the sub-chamber.

According to the aspect of the disclosure, the communication holes of the sub-chamber include a first communication hole on the intake side and a second communication hole on the exhaust side. The first communication hole is closer to the piston than the second communication hole is, that is, is located on a side further in the D direction. In this way, a sufficient amount of intake flow is introduced into the sub-chamber through the first communication hole. The first communication hole is inclined so as to be directed further in the D direction as it is positioned toward the inside from the outside of the sub-chamber. Therefore, the intake flow in an oblique direction that includes a D direction component becomes easier to enter the sub-chamber through the first communication hole. As described above, a sufficient amount of intake flow is more easily taken in the sub-chamber. The gas taken in the sub-chamber is discharged to the outside of the sub-chamber through the second communication hole disposed on the U direction side. Therefore, inside the sub-chamber, a purge gas flow in the U direction is generated. As a result, the purge gas spreads in most of the area in the sub-chamber. From the above, purge performance in the sub-chamber is further improved. Since the purge in the sub-chamber is effectively performed, a residual gas is reduced, and thus the ignitability and the combustibility in the sub-chamber are further improved.

According to the aspect of the disclosure, the second communication hole on the exhaust side is inclined so as to be directed further in the D direction as it is positioned toward the outside from the inside of the sub-chamber. The direction of the inclination of the second communication hole coincides with the direction of a tumble flow in the main combustion chamber. Therefore, the purge gas that is discharged into the main combustion chamber through the second communication hole acts so as to further strengthen the tumble flow. This action contributes to improvement in the combustibility in the main combustion chamber.

According to the aspect of the disclosure, the first communication hole on the intake side narrows toward the inside from the outside of the sub-chamber. Therefore, the intake flow easily enters the sub-chamber through the first communication hole, and the purge gas in the sub-chamber is difficult to flow out from the first communication hole to the outside of the sub-chamber. Therefore, the purge performance in the sub-chamber is further improved.

According to the aspect of the disclosure, the second communication hole on the exhaust side narrows toward the outside from the inside of the sub-chamber. Therefore, the purge gas is the sub-chamber is easily discharged from the second communication hole to the outside, and the gas in the main combustion chamber is difficult to enter the sub-chamber through the second communication hole. Therefore, the purge performance in the sub-chamber is further improved. Further, a jet at the time of combustion is also easily ejected from the second communication hole on the exhaust side. The jet that is ejected to the exhaust side further strengthens the tumble flow that is generated in the main combustion chamber at the time of combustion. Since the tumble flow at the time of combustion is strengthened, the combustibility in the main combustion chamber is further improved.

According to the aspect of the disclosure, the third communication hole is provided in the bottom wall of the sub-chamber. The intake flow along the bottom wall of the sub-chamber generates a negative pressure, and due to the negative pressure, the gas in the sub-chamber is sucked out through the third communication hole. That is, the purge in the sub-chamber is promoted, and thus the purge performance is further improved.

According to the aspect of the disclosure, the bottom wall of the sub-chamber is inclined so as to follow the direction of the intake flow. In this case, the intake gas more easily flows along the bottom wall. Therefore, the negative pressure increases, and thus the purge in the sub-chamber by the negative pressure is further promoted.

According to the aspect of the disclosure, the third communication hole narrows toward the outside from the inside of the sub-chamber. Therefore, the purge gas in the sub-chamber is easily discharged from the third communication hole to the outside, and the gas in the main combustion chamber is difficult to enter the sub-chamber through the third communication hole. Accordingly, the purge performance in the sub-chamber is further improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the disclosure will be described with reference to the accompanying drawings.

Figure 1:
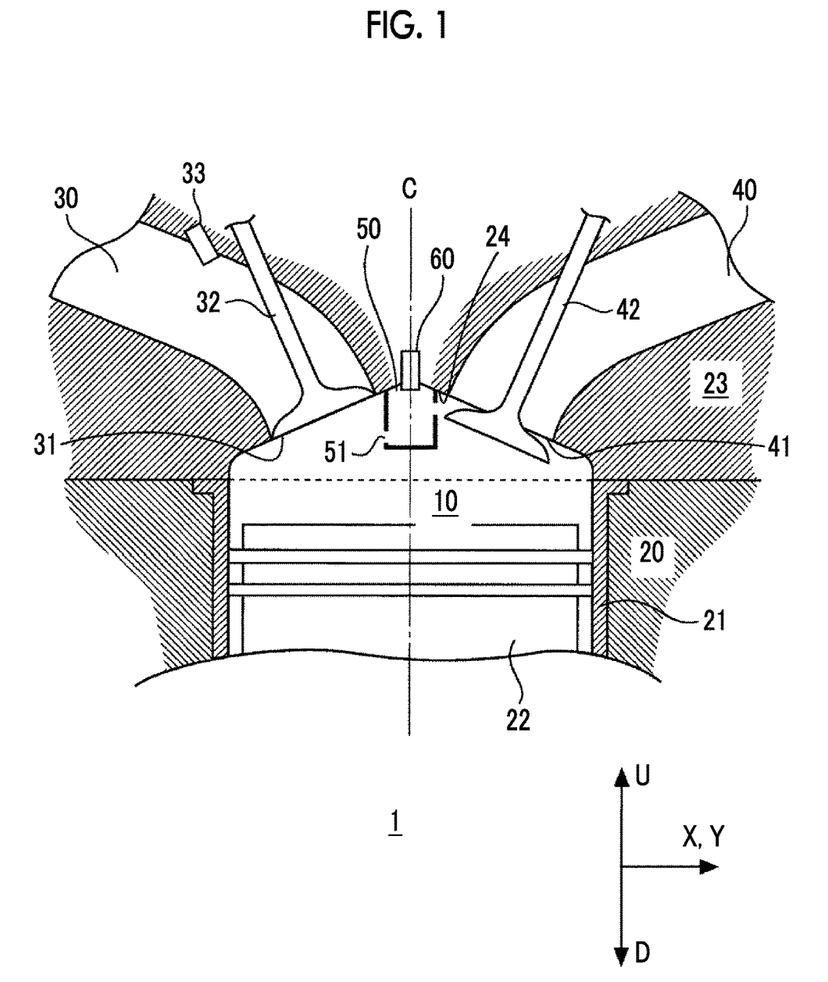
FIG. 1 is a sectional view schematically showing a configuration example of an internal combustion engine according to a first embodiment of the disclosure.

FIG. 1 is a sectional view schematically showing a configuration example of an internal combustion engine 1 according to a first embodiment of the disclosure. The internal combustion engine 1 is configured to mainly include a main combustion chamber 10, an intake port 30, an exhaust port 40, a sub-chamber 50, and a spark plug 60.

The main combustion chamber 10 is a space surrounded by a cylinder block 20, a piston 22, and a cylinder head 23. More specifically, the cylinder block 20 is provided with a cylindrical cylinder liner 21 (a cylinder bore) forming the side wall of the main combustion chamber 10. In the drawings, the central axis of the cylindrical cylinder liner 21 is represented by a symbol "C". The piston 22 is disposed so as to be able to reciprocate along an axial direction of the cylinder liner 21. The upper surface of the piston 22 forms the bottom surface of the main combustion chamber 10. The cylinder head 23 is installed on the cylinder block 20 so as to face the piston 22. A head bottom surface 24 that is the bottom surface of the cylinder head 23 forms the upper surface of the main combustion chamber 10. As described above, the piston 22 and the cylinder head 23 (the head bottom surface 24) face each other, and the main combustion chamber 10 is interposed between the piston 22 and the cylinder head 23.

Here, a coordinate system that is used in the following description is defined. A "U direction" and a "D direction" respectively are an upward moving direction and a downward moving direction of the piston 22. The "U direction" and the "D direction" are parallel to the central axis C and are opposite directions to each other. In a case of being viewed from the inside of the main combustion chamber 10, the U direction is a direction away from the piston 22 and approaching the head bottom surface 24. On the other hand, the D direction is a direction approaching the piston 22 and away from the head bottom surface 24. A plane orthogonal to the U direction and the D direction is an "X-Y plane".

The intake port 30 supplies intake gas to the main combustion chamber 10. More specifically, the intake port 30 is formed in the cylinder head 23 and connected to the main combustion chamber 10. An opening portion of the intake port 30 with respect to the main combustion chamber 10 is an intake opening portion 31. That is, the intake port 30 is connected to the main combustion chamber 10 at the intake opening portion 31. An intake valve 32 is provided in the intake opening portion 31 so as to be able to open and close the intake opening portion 31.

Further, a fuel injection valve 33 is provided in the intake port 30. The fuel injection valve 33 supplies fuel to the inside of the intake port 30. An air-fuel mixture is supplied to the main combustion chamber 10 as the intake gas. As a fuel supply system, an in-cylinder injection system may be used instead of a port injection system. In the case of the in-cylinder injection system, air is supplied from the intake port 30 to the main combustion chamber 10 and fuel is directly injected into the main combustion chamber 10 by an in-cylinder injection valve.

The exhaust port 40 discharges exhaust gas from the main combustion chamber 10. More specifically, the exhaust port 40 is formed in the cylinder head 23 and connected to the main combustion chamber 10. An opening portion of the exhaust port 40 with respect to the main combustion chamber 10 is an exhaust opening portion 41. That is, the exhaust port 40 is connected to the main combustion chamber 10 at the exhaust opening portion 41. An exhaust valve 42 is provided in the exhaust opening portion 41 so as to be able to open and close the exhaust opening portion 41.

The sub-chamber 50 is disposed in the main combustion chamber 10. More specifically, as shown in FIG. 1, the sub-chamber 50 is provided on the cylinder head 23 (the head bottom surface 24) between the intake opening portion 31 and the exhaust opening portion 41. The sub-chamber 50 protrudes from the cylinder head 23 toward the main combustion chamber 10. However the sub-chamber 50 does not interfere with the piston 22 at the top dead center. Further, the sub-chamber 50 has a plurality of communication holes 51 which is connected to the main combustion chamber 10. That is, the sub-chamber 50 is connected to the main combustion chamber 10 through the communication holes 51.

The spark plug 60 is provided at an upper part (on the U direction side) of the sub-chamber 50 such that spark ignition can be performed in the sub-chamber 50. That is, the internal combustion engine 1 according to this embodiment adopts a system in which combustion is started by performing spark ignition in the sub-chamber 50.

Figure 2:
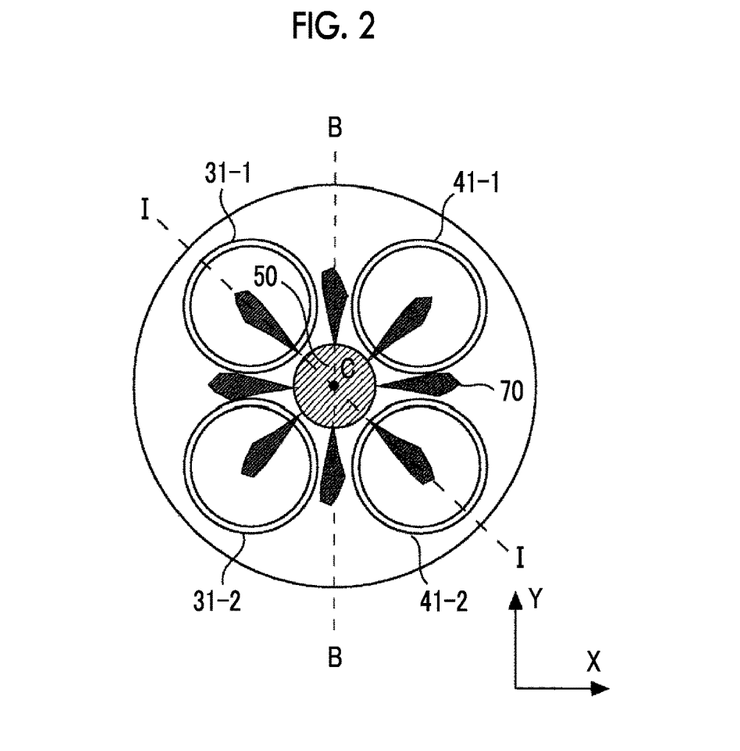
FIG. 2 is a plan view schematically showing the configuration example of the internal combustion engine according to the first embodiment of the disclosure.

FIG. 2 shows an arrangement example of the intake opening portion 31, the exhaust opening portion 41, and the sub-chamber 50 when viewed from the U direction, that is, in the X-Y plane.

In the arrangement example shown in FIG. 2, a plurality of intake opening portions 31-1, 31-2 and a plurality of exhaust opening portions 41-1, 41-2 are provided with respect to a single main combustion chamber 10. The intake opening portions 31-1, 31-2 and the exhaust opening portions 41-1, 41-2 are arranged so as to surround the central axis C of the main combustion chamber 10. The sub-chamber 50 is disposed in the vicinity of the central axis C of the main combustion chamber 10. That is, the sub-chamber 50 is surrounded by the intake opening portions 31-1, 31-2 and the exhaust opening portions 41-1, 41-2.

FIG. 1 described above corresponds to a sectional view taken along line I-I in FIG. 2. Further, line B-B in FIG. 2 is a line that separates the intake side and the exhaust side. The line B-B is parallel to a Y direction and passes through the position of the sub-chamber 50. The side on which the intake opening portions 31-1, 31-2 are present, when viewed from the line B-B (the sub-chamber 50), is the "intake side". On the other hand, the side on which the exhaust opening portions 41-1, 41-2 are present, when viewed from the line B-B (the sub-chamber 50), is the "exhaust side".

Figure 3:
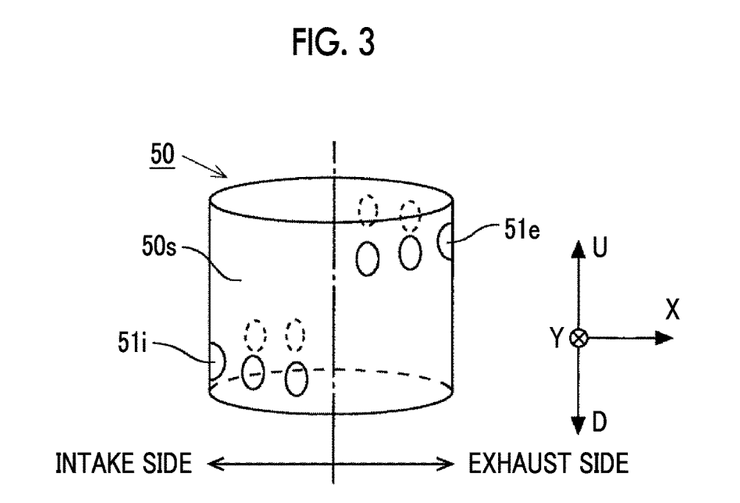
FIG. 3 is a schematic diagram showing a configuration example of a sub-chamber of the internal combustion engine according to the first embodiment of the disclosure.

FIG. 3 shows in more detail the configuration of the sub-chamber 50 in this embodiment. A side wall 50s of the sub-chamber 50 is parallel to the U direction and the D direction and is orthogonal to the X-Y plane. The communication holes 51 are formed in the side wall 50s. More specifically, the communication holes 51 include a "first communication hole 51i on the intake side" and a "second communication hole 51e on the exhaust side". The first communication hole 51i is formed in the side wall 50s on the intake side. On the other hand, the second communication hole 51e is formed in the side wall 50s on the exhaust side. The number of each of the first communication holes 51i and the second communication holes 51e is arbitrary.

A combustion process in the internal combustion engine 1 according to this embodiment described above is as follows.

In an intake process, the air-fuel mixture is supplied from the intake port 30 to the main combustion chamber 10. In the case of the in-cylinder injection system, the air-fuel mixture is formed in the main combustion chamber 10. In a compression process, a part of the air-fuel mixture in the main combustion chamber 10 enters the sub-chamber 50 through the communication hole 51. At a predetermined ignition timing, the spark plug 60 performs spark ignition in the sub-chamber 50. In this way, combustion is started in the sub-chamber 50. Flame generated in the sub-chamber 50 is vigorously ejected to the main combustion chamber 10 through the communication hole 51 (refer to FIG. 2). The flame which is ejected from the sub-chamber 50 to the main combustion chamber 10 through the communication hole 51 is also called a jet 70. The jet 70 grows in the main combustion chamber 10, whereby the combustion progresses in the main combustion chamber 10. The communication hole 51 of the sub-chamber 50 serves as an introduction hole for introducing the air-fuel mixture from the main combustion chamber 10 into the sub-chamber 50 and also serves as an ejection hole for ejecting the jet 70 from the sub-chamber 50 toward the mam combustion chamber 10.

When a lot of residual gas from the previous cycle remains in the sub-chamber 50, ignitability and combustibility in the sub-chamber 50 deteriorate. In order to improve the ignitability and the combustibility in the sub-chamber 50, it is significant to effectively perform "purge" in the sub-chamber 50.

Figure 4:
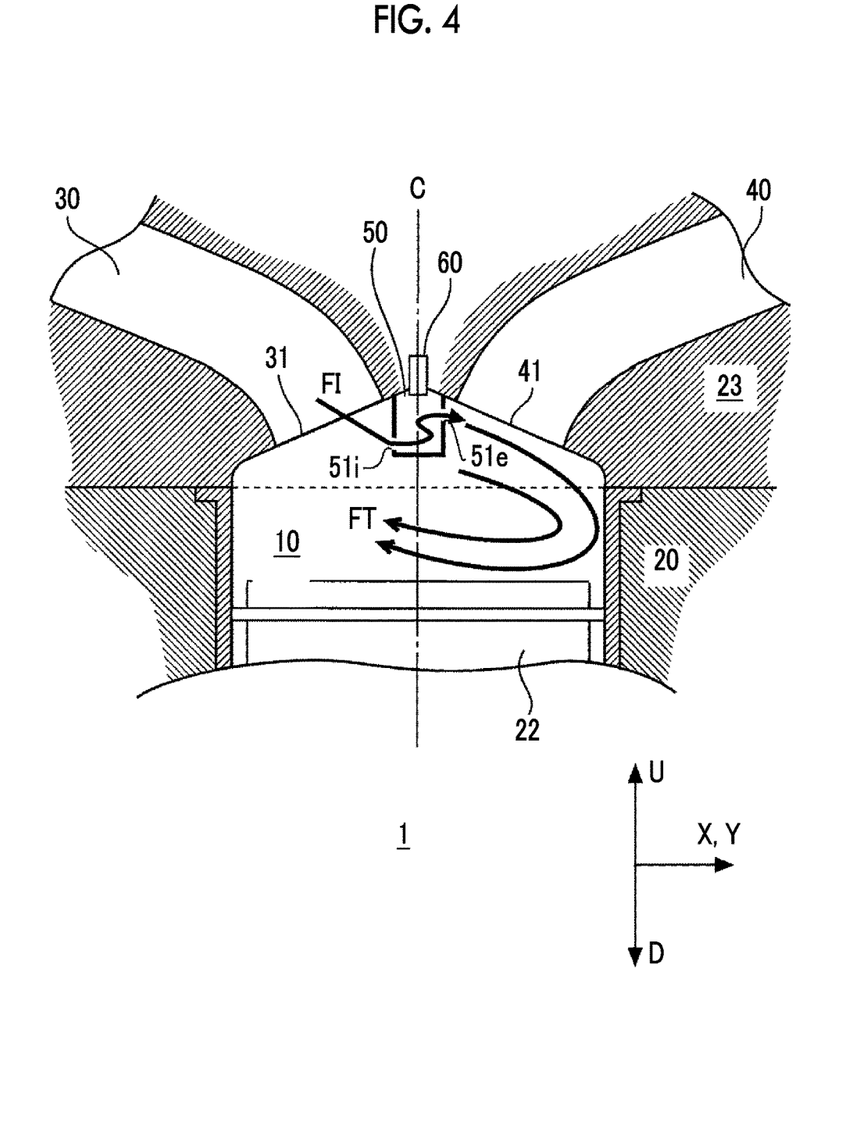
FIG. 4 is a schematic diagram for describing purge in the sub-chamber of the internal combustion engine according to the first embodiment of the disclosure.

FIG. 4 is a schematic diagram for describing the purge in the sub-chamber 50 according to this embodiment. The format of FIG. 4 is the same as that of FIG. 1 described above. However, the illustration of the intake valve 32 and the exhaust valve 42 is omitted.

In the intake process, the intake gas is sucked into the main combustion chamber 10 from the intake port 30, and a tumble flow FT is generated in the main combustion chamber 10. In FIG. 4, an intake flow (a flow of the intake gas) in the vicinity of the intake opening portion 31 is particularly represented by a symbol "FI". Since the intake port 30 is inclined with respect to the X-Y plane, the direction of the intake flow FI in the vicinity of the intake opening portion 31 is an oblique direction that includes a D direction component.

According to this embodiment, the intake flow FI is used for the purge in the sub-chamber 50. That is, a part of the intake flow FI is taken into the sub-chamber 50, whereby the purge in the sub-chamber 50 is performed. More specifically, a part of the intake flow FI is introduced into the sub-chamber 50 through the first communication hole 51*i* on the intake side. Then, the purge gas in the sub-chamber 50 is discharged to the outside of the sub-chamber 50 through the second communication hole 51*e* on the exhaust side. In this way, the purge in the sub-chamber 50 is realized.

Further, the sub-chamber 50 according to this embodiment has structural features for further enhancing the purge performance. Specifically, as shown in FIGS. 3 and 4, in a case where the first communication hole 51*i* is compared with the second communication hole 51*e*, the first communication hole 51*i* is disposed relatively on the D direction side and the second communication hole 51*e* is disposed relatively on the U direction side. In other words, the first communication hole 51*i* is disposed so as to be relatively close to the piston 22 and the second communication hole 51*e* is disposed so as to be relatively close to the cylinder head 23 (the head bottom surface 24).

Figure 5:
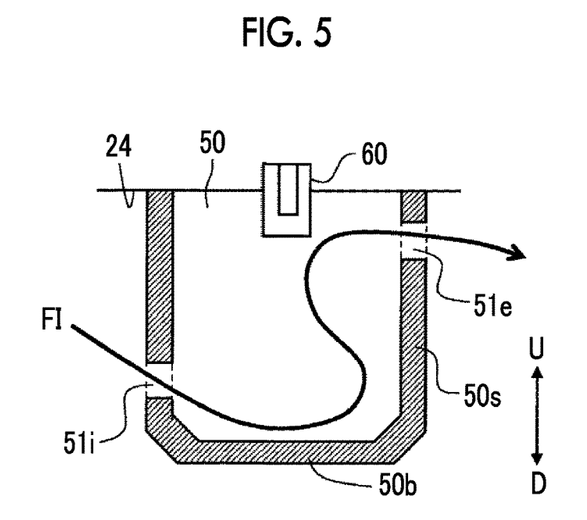
FIG. 5 is a schematic diagram for describing purge in the sub-chamber of the internal combustion engine according to the first embodiment of the disclosure.

The purge in the sub-chamber 50 according to this embodiment will be described in more detail with reference to FIG. 5. As described above, the direction of the intake flow FI is an oblique direction that includes a D direction component. The intake flow FI is introduced into the sub-chamber 50 through the first communication hole 51*i* disposed on the D direction side. The purge gas in the sub-chamber 50 is discharged to the outside of the sub-chamber 30 through the second communication hole 51*e* disposed on the U direction side. Therefore, as shown in FIG. 5, the flow of the purge gas in the U direction is generated in the sub-chamber 50. In other words, inside the sub-chamber 50, the purge gas spreads entirely from the vicinity of a bottom wall 50*b* of the sub-chamber 50 to the vicinity of the spark plug 60. That is, the purge is effectively performed in the sub-chamber 50. In this way, the residual gas is reduced, and as a result, the ignitability and the combustibility in the sub-chamber 50 are further improved.

Figure 6:
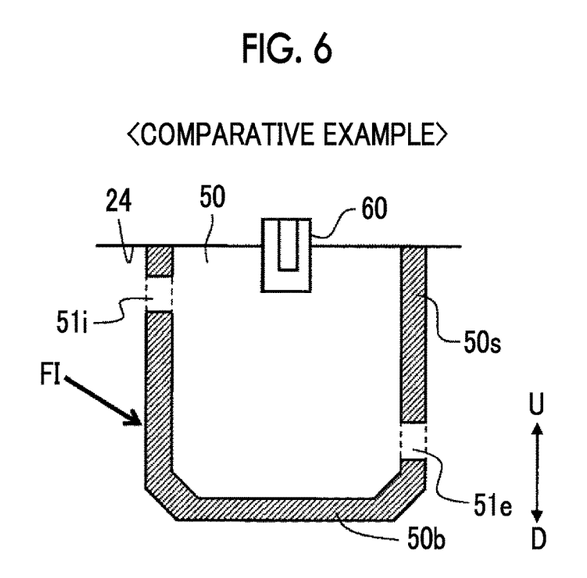
FIG. 6 is a schematic diagram showing a comparative example.

FIG. 6 shows a comparative example. In the comparative example, the positional relationship between the first communication hole 51*i* and the second communication hole 51*e* is opposite to that in the case of this embodiment. That is, the first communication hole 51*i* is disposed relatively on the U direction side and the second communication hole 51*e* is disposed relatively on the D direction side. In other words, the first communication hole 51*i* is close to the head bottom surface 24 and the second communication hole 51*e* is close to the bottom wall 50*b* of the sub-chamber 50. Even in this case, when the intake flow FI enters the sub-chamber 50, it is expected that the purge gas spreads in the sub-chamber 50.

However, as described above, the direction of the intake flow FI is an oblique direction that includes a D direction component. In other words, the direction of the intake flow FI is a direction away from the head bottom surface 24. Therefore, the amount of the intake flow FI is small in the vicinity of the head bottom surface 24, and thus a sufficient amount of the intake flow FI cannot be taken in from the first communication hole 51*i* close to the head bottom surface 24.

In order to take a sufficient amount of the intake flow FI into the sub-chamber 50, the first communication hole 51*i* is disposed on the D direction side, like this embodiment. By disposing the second communication hole 51*e* closer to the U direction side than the first communication hole 51*i*, it becomes possible to spread the purge gas in the sub-chamber 50. From the above, according to this embodiment, the purge performance in the sub-chamber 50 is further improved. Since the purge in the sub-chamber 50 is effectively performed, the residual gas is reduced, and thus the ignitability and the combustibility in the sub-chamber 50 are further improved.

Figure 7:
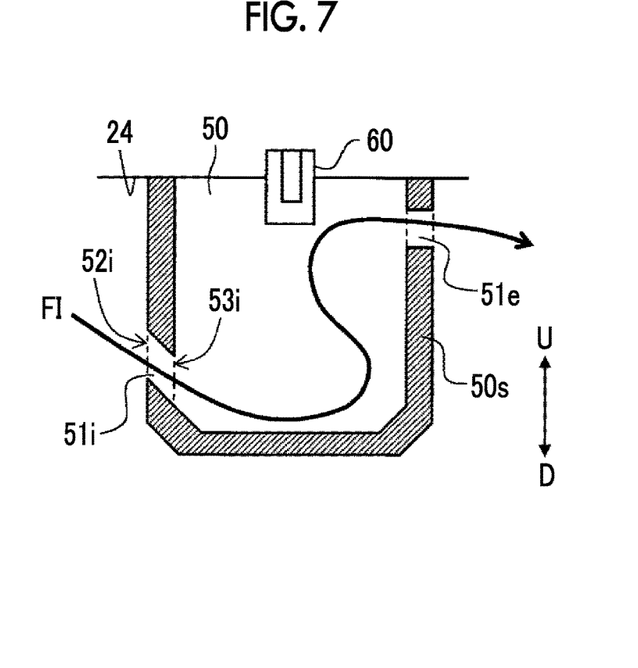
FIG. 7 is a schematic diagram showing an example of a configuration of a sub-chamber of an internal combustion engine according to a second embodiment of the disclosure.

FIG. 7 is a schematic diagram showing an example of the configuration of the sub-chamber 50 according to a second embodiment of the disclosure. Description overlapping that in the embodiment described above will be omitted as appropriate. According to this embodiment, the inclination of the first communication hole 51*i* on the intake side is designed in consideration of the direction of the intake flow FI. That is, the first communication hole 51*i* is formed such that the intake flow FI more easily enters the sub-chamber 50 through the first communication hole 51*i*.

More specifically, the first communication hole 51*i* has an outer opening 52*i* that is an opening portion feeing the outside of the sub-chamber 50, and an inner opening 53*i* that is an opening portion facing the inside of the sub-chamber 50. In a case where the outer opening 52*i* is compared with the inner opening 53*i*, the outer opening 52*i* is located relatively on the U direction side and the inner opening 53*i* is located relatively on the D direction side. That is, the first communication hole 51*i* is inclined so as to be directed further in the D direction as it is positioned toward the inside from the outside of the sub-chamber 50.

The direction of the inclination of the first communication hole 51*i* as described above coincides with the direction of the intake flow FI that includes the D direction component. Therefore, the intake flow FI becomes easier to enter the sub-chamber 50 through the first communication hole 51*i*. In other words, it becomes easy to take the intake flow FI into the sub-chamber 50. Therefore, the purge performance in the sub-chamber 50 is further improved.

Figure 8:
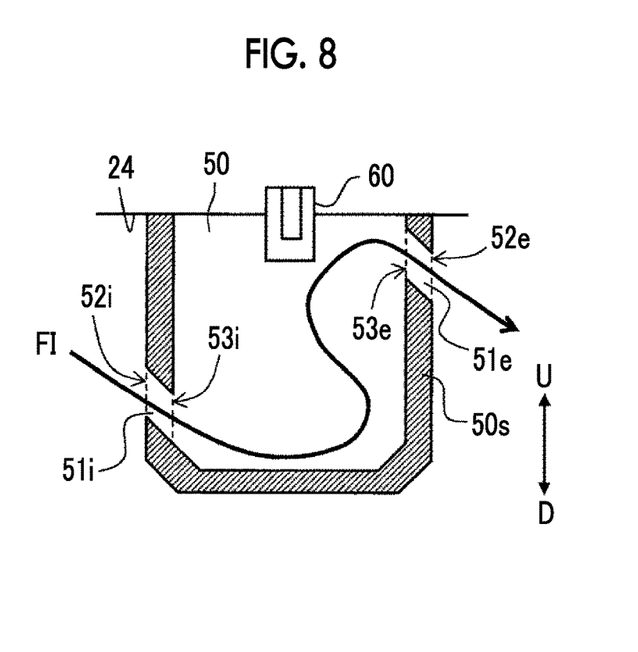
FIG. 8 is a schematic diagram showing another example of the configuration of the sub-chamber of the internal combustion engine according to the second embodiment of the disclosure.

FIG. 8 is a schematic diagram showing another example of the configuration of the sub-chamber 50 according to the second embodiment. In the example shown in FIG. 8, the second communication hole 51*e* on the exhaust side is also formed so as to be inclined.

More specifically, the second communication hole 51*e* has an outer opening 52*e* that is an opening portion facing the outside of the sub-chamber 50, and an inner opening 53*e* that is an opening portion facing the inside of the sub-chamber 50. In a case where the outer opening 52*e* is compared with the inner opening 53*e*, the outer opening 52*e* is located relatively on the D direction side and the inner opening 53*e* is located relatively OH the U direction side. That is, the second communication hole 51*e* is inclined so as to be directed further in the D direction as it is positioned toward the outside from the inside of the sub-chamber 50.

The direction of the inclination of the second communication hole 51e as described above coincides with the direction of the tumble flow FT (refer to FIG. 4) in the vicinity of the second communication hole 51e. Therefore, the purge gas that is discharged to the main combustion chamber 10 through the second communication hole 51e acts so as to strengthen the tumble flow FT. This action contribute to improvement in the combustibility in the main combustion chamber 10.

Figure 9:
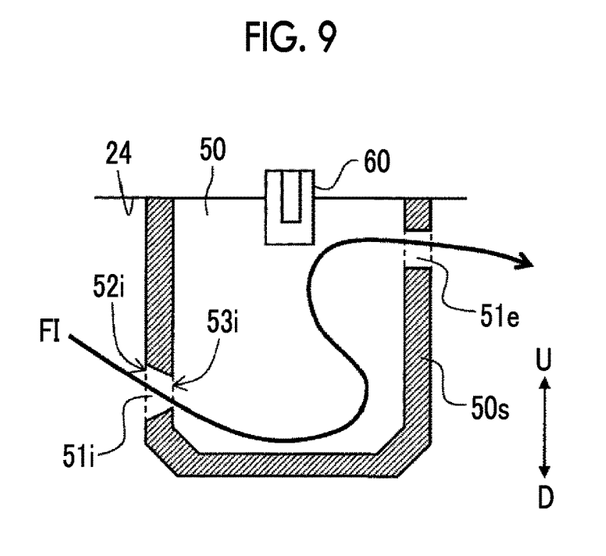
FIG. 9 is a schematic diagram showing an example of a configuration of a sub-chamber of an internal combustion engine according to a third embodiment of the disclosure.

FIG. 9 is a schematic diagram showing an example of the configuration of the sub-chamber 50 according to a third embodiment of the disclosure. Description overlapping that in the embodiments described above will be omitted as appropriate. In this embodiment, the diameter (the sectional area) of the first communication hole 51i on the intake side is not uniform. More specifically, the diameter of the inner opening 53i of the first communication hole 51i is smaller than the diameter of the outer opening 52i. That is, the first communication hole 51i is formed so as to become narrower toward the inside from the outside of the sub-chamber 50.

In the case, of the shape of the first communication hole 51i as described above, the gas easily enters the inside from the outside of the sub-chamber 50, while the gas is difficult to flow out from the inside to the outside of the sub-chamber 50. That is, the intake flow FI easily enters the sub-chamber 50 through the first communication hole 51i, and the purge gas in the sub-chamber 50 is difficult to flow put to the outside from the first communication hole 51i. Therefore, the purge performance in the sub-chamber 50 is further improved.

Figure 10:
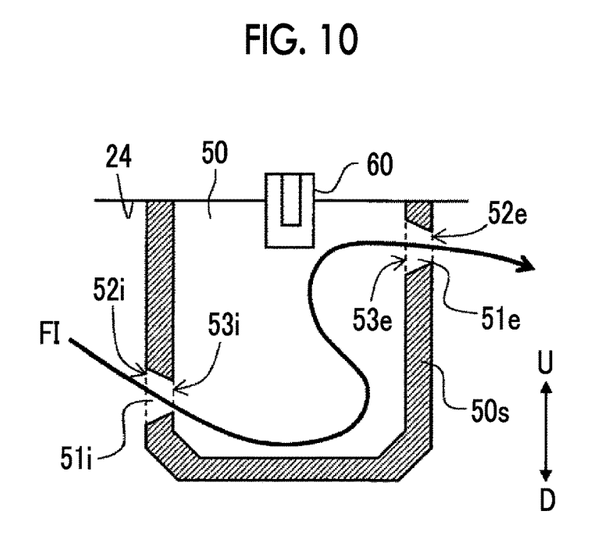
FIG. 10 is a schematic diagram showing another example of the configuration of the sub-chamber of the internal combustion engine according to the third embodiment of the disclosure.

FIG. 10 is a schematic diagram showing another example of the configuration of the sub-chamber 50 according to the third embodiment. In the example shown in FIG. 10, the diameter (the sectional area) of the second communication hole 51e on the exhaust side is also not uniform. More specifically, the diameter of the outer opening 52e of the second communication hole 51e is smaller than the diameter of the inner opening 53e. That is, the second communication hole 51e is formed so as to become narrower toward the outside from the inside of the sub-chamber 50.

In the case of the shape of the second communication hole 51e as described above, the gas easily flows out from the inside to the outside of the sub-chamber 50, while the gas is difficult to enter from the outside to the inside of the sub-chamber 50. That is, the purge gas in the sub-chamber 50 is easily discharged to the outside from the second communication hole 51e, and the gas in the main combustion chamber 10 is difficult to enter the sub-chamber 50 through the second communication hole 51e. Therefore, the purge performance in the sub-chamber 50 is further improved.

Figure 11:
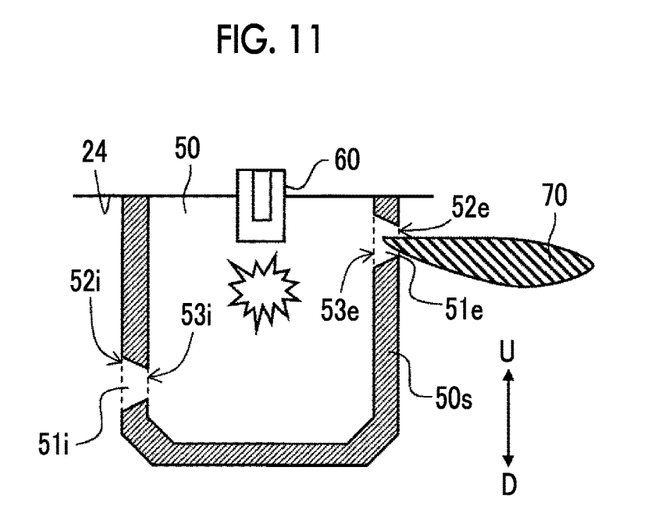
FIG. 11 is a schematic diagram for describing an additional effect according to the third embodiment of the disclosure.

FIG. 11 is a schematic diagram for describing an additional effect. Here, a combustion state is considered in which after the spark plug 60 performs spark ignition in the sub-chamber 50, the jet 70 is injected into the main combustion chamber 10 through the second communication hole 51e.

As described above, the first communication hole 51i has a shape in which it is difficult for the gas to flow out from the inside to the outside of the sub-chamber 50. On the other hand, the second communication hole 51e has a shape in which it is easy for the gas to flow out from the inside to the outside of the sub-chamber 50. The same applies to the jet 70 at the time of combustion. That is, the jet 70 is difficult to be ejected from the first communication hole 51i and is easy to be ejected from the second communication hole 51e. In other words, the jet 70 at the time of combustion is preferentially injected from the second communication hole 51e on the exhaust side. Further, the jet 70 passes through the tapered second communication hole 51e, so that the jet 70 becomes faster and more powerful.

As described above, according to this embodiment, at the time of combustion, the powerful jet 70 is injected from the second communication hole 51e on the exhaust side. The jet 70 that is ejected to the exhaust side further strengthens the tumble flow that is generated in the main combustion chamber 10 at the time of combustion. Since the tumble flow at the time of combustion is strengthened, the combustibility in the main combustion chamber 10 is further improved. Even in a case where solely the second communication hole 51e has a tapered shape, the same effect is obtained to some extent.

Figure 12:
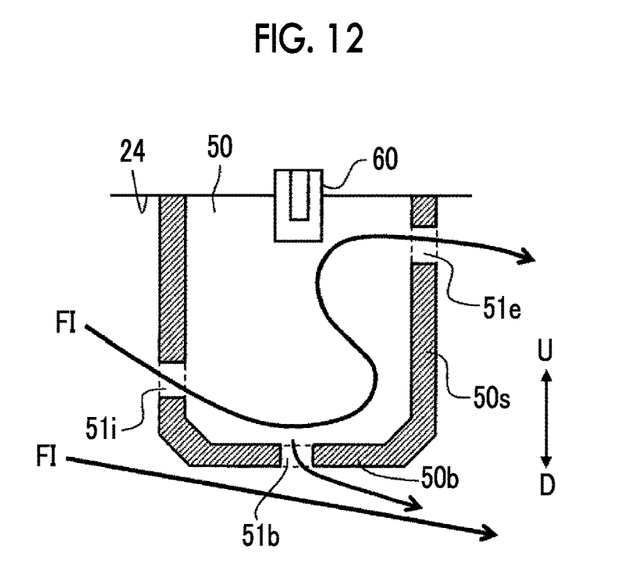
FIG. 12 is a schematic diagram showing an example of a configuration of a sub-chamber of an internal combustion engine according to a fourth embodiment of the disclosure.

FIG. 12 is a schematic diagram showing an example of the configuration of the sub-chamber 50 according to a fourth embodiment of the disclosure. Description overlapping that in the embodiments described above will be omitted as appropriate. In this embodiment, a third communication hole 51b is formed in the bottom wall 50b of the sub-chamber 50. That is, the communication holes 51 of the sub-chamber 50 also include the third communication hole 51b in addition to the first communication hole 51i and the second communication hole 51e.

As shown in FIG. 12, the intake flow FI is also present in the vicinity of the bottom wall 50b of the sub-chamber 50. The intake flow FI along the bottom wall 50b generates a negative pressure in the vicinity of the bottom wall 50b. Due to the negative pressure, the gas in the sub-chamber 50 is sucked out through the third communication hole 51b. That is, the purge in the sub-chamber 50 is promoted, and thus the purge performance is further improved.

Figure 13:
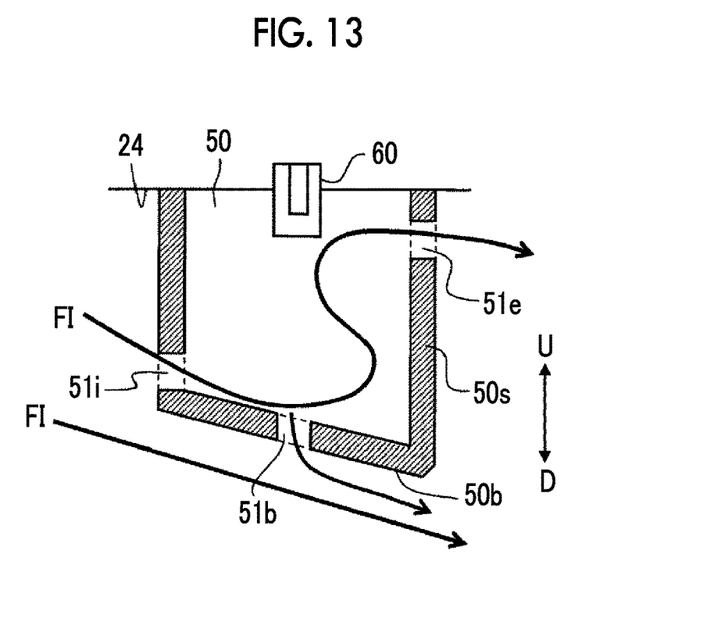
FIG. 13 is a schematic diagram showing another example of the configuration of the sub-chamber of the internal combustion engine according to the fourth embodiment of the disclosure.

FIG. 13 is a schematic diagram showing another example of the configuration of the sub-chamber 50 according to the fourth embodiment. In the example shown in FIG. 13, the bottom wall 50b is inclined so as to follow the direction of the intake flow FI. More specifically, in a case of considering the direction toward the exhaust side from the intake side (the rightward direction in FIG. 13), the bottom wall 50b is inclined so as to be directed further in the D direction as it is positioned in the direction toward the exhaust side from the intake side. In this case, the intake gas more easily flows along the bottom wall 50b. Therefore, the negative pressure increases, and thus the purge in the sub-chamber 50 by the negative pressure is further promoted.

Figure 14:
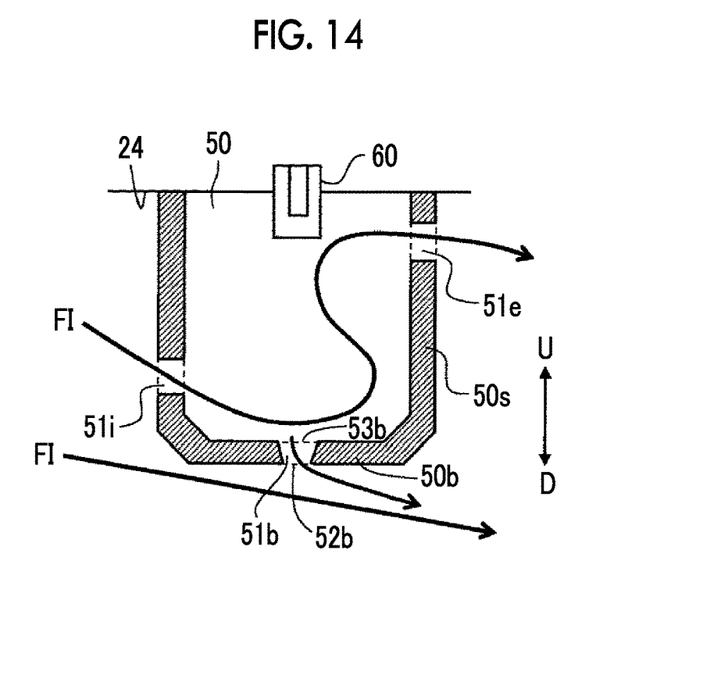
FIG. 14 is a schematic diagram showing still another example of the configuration of the sub-chamber of the internal combustion engine according to the fourth embodiment of the disclosure.

FIG. 14 is a schematic diagram showing still another example of the configuration of the sub-chamber 50 according to the fourth embodiment. The third communication hole 51b has an outer opening 52b that is an opening portion facing the outside of the sub-chamber 50, and an inner opening 53b that is an opening portion facing the inside of the sub-chamber 50. The diameter of the outer opening 52b of the third communication hole 51b is smaller than the diameter of the inner opening 53b. That is, the third communication hole 51b is formed so as to become narrower toward the outside from the inside of the sub-chamber 50.

In the case of the shape of the third communication hole 51b as described above, the gas easily flows out from the inside to the outside of the sub-chamber 50, while the gas is difficult to enter the inside from the outside of the sub-chamber 50. That is, the purge gas in the sub-chamber 50 is easily discharged from the third communication hole 51b to the outside, and the gas in the main combustion chamber 10 is difficult to enter the sub-chamber 50 through the third communication hole 51b. Therefore, the purge performance in the sub-chamber 50 is further improved.

As long as there is no contradiction, it is also possible to combine a plurality of embodiments among the first to fourth embodiments described above.

Figure 15:
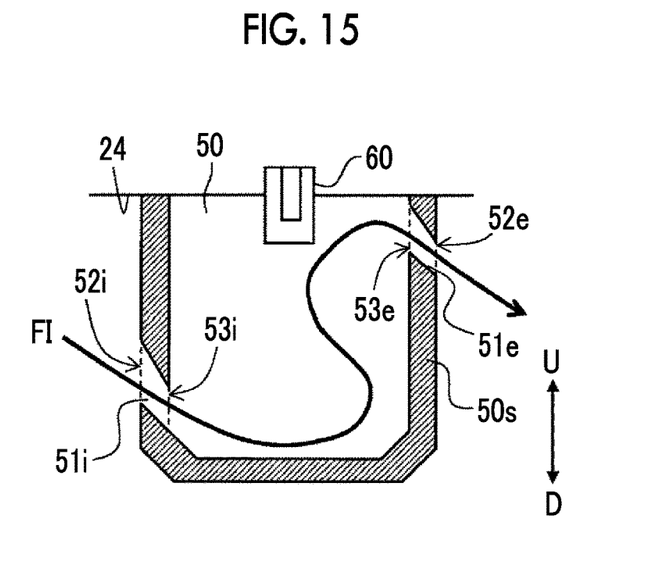
FIG. 15 is a schematic diagram showing an example of a configuration of a sub-chamber of an internal combustion engine according to a fifth embodiment of the disclosure.

For example, FIG. 15 shows a combination of the example shown in FIG. 8 and the example shown in FIG. 10. The first communication hole 51i is formed so as to be directed further in the D direction as it is positioned toward the inside from the outside of the sub-chamber 50 and to become narrower toward the inside from the outside of the sub-chamber 50. The second communication hole 51e is formed so as to be directed further in the D direction as it is positioned toward the outside from the inside of the sub-chamber 50 and to become narrower toward the outside from the inside of the sub-chamber 50. In this way, the effects of both the second and third embodiments are obtained.

What is clamed is:

1. An internal combustion engine comprising:
a main combustion chamber interposed between a cylinder head and a piston facing the cylinder head;
an intake port which is provided in the cylinder head and connected to the main combustion chamber at an intake opening portion;
an exhaust port which is provided in the cylinder head and connected to the main combustion chamber at an exhaust opening portion;
a sub-chamber which is provided on the cylinder head between the intake opening portion and the exhaust opening portion and connected to the main combustion chamber through a plurality of communication holes; and
a spark plug provided so as to perform ignition in the sub-chamber, wherein:
the communication holes include
a first communication hole provided on the intake opening portion side in a side wall of the sub-chamber, and
a second communication hole provided on the exhaust opening portion side in the side wall;
the first communication hole is closer to the piston than the second communication hole is; and
the first communication hole is inclined so as to be closer to the piston as the first communication hole is positioned toward an inside from an outside of the sub-chamber.

2. The internal combustion engine according to claim 1, wherein the second communication hole is inclined so as to be closer to the piston as the second communication hole is positioned toward the outside from the inside of the sub-chamber.

3. The internal combustion engine according to claim 1, wherein the first communication hole narrows toward the inside from the outside of the sub-chamber.

4. The internal combustion engine according to claim 1, wherein the second communication hole narrows toward the outside from the inside of the sub-chamber.

5. The internal combustion engine according to claim 1, wherein the communication holes further include a third communication hole provided in a bottom wall of the sub-chamber.

6. The internal combustion engine according to claim 5, wherein:
a direction toward the exhaust opening portion from the intake opening portion is a first direction; and
the bottom wall is closer to the piston as the bottom wall is positioned in the first direction.

7. The internal combustion engine according to claim 5, wherein the third communication hole narrows toward the outside from the inside of the sub-chamber.

* * * * *

UNITED STATES PATENT AND TRADEMARK OFFICE
CERTIFICATE OF CORRECTION

PATENT NO. : 10,196,963 B2
APPLICATION NO. : 15/895090
DATED : February 5, 2019
INVENTOR(S) : Sachio Mori Page 1 of 1

It is certified that error appears in the above-identified patent and that said Letters Patent is hereby corrected as shown below:

In the Claims

Column 8, Line 36, delete "feeing" and insert --facing--, therefor.

Column 8, Line 66, after "relatively", delete "OH" and insert --on--, therefor.

Signed and Sealed this
Twenty-third Day of April, 2019

Andrei Iancu
*Director of the United States Patent and Trademark Office*